May 12, 1936.  F. H. RIEHL  2,040,710
GROUND ROLLING AND PULVERIZING IMPLEMENT
Filed June 28, 1935
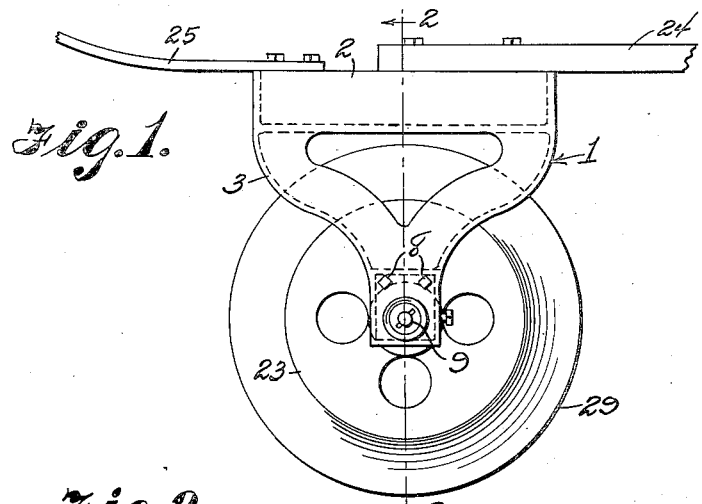
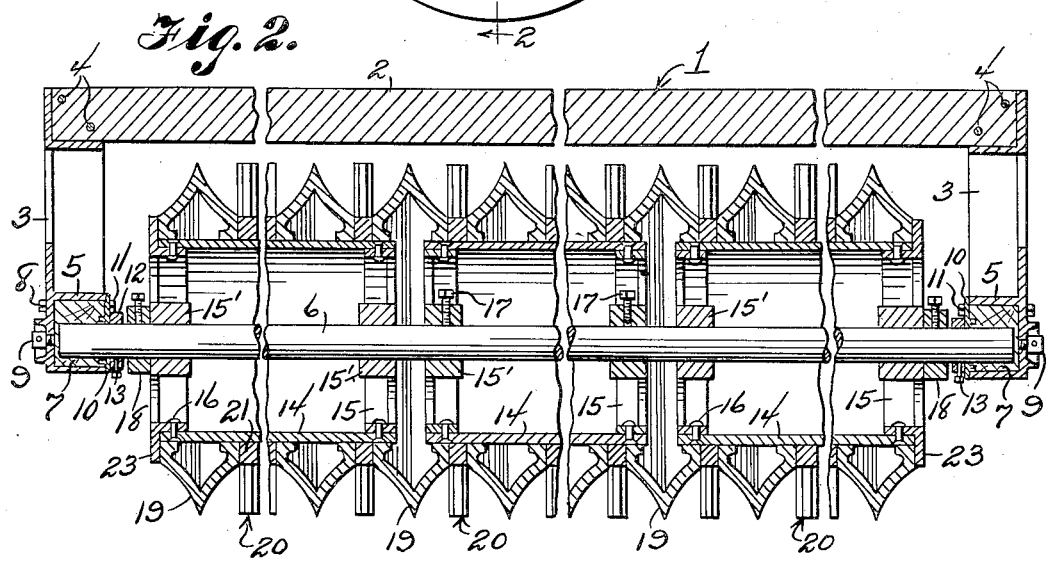
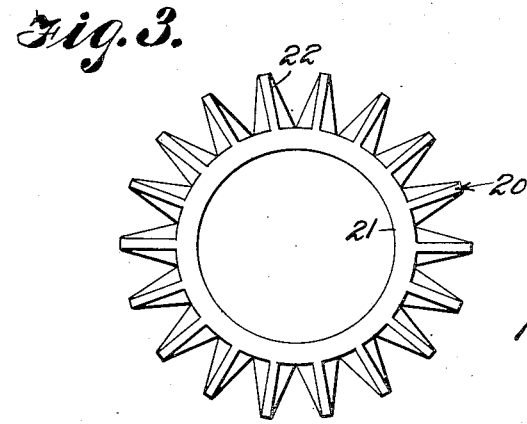
Frederick Hugh Riehl
INVENTOR
BY Victor J. Evans & Co.
ATTORNEY Patented May 12, 1936

2,040,710

UNITED STATES PATENT OFFICE 2,040,710

GROUND ROLLING AND PULVERIZING IMPLEMENT

Frederick Hugh Riehl, Sandusky, Mich.

Application June 28, 1935, Serial No. 28,949

2 Claims. (Cl. 55—77)

My invention relates to improvements in ground rolling and pulverizing implements of the type characterized by a plurality of annular ground working members rotatably mounted side by side in roller formation.

In implements of the above designated type as heretofore constructed, the annular ground working members are either mounted by a common axle shaft, or secured together in gangs for rotation as such about a common shaft, or are mounted side by side upon spaced apart shafts in the form of anti-friction rollers. All of these forms of implements are open to the objection that they lack the flexibility requisite to easy turning of the implement and to adequate adjustment of the ground working members for taking up side play therebetween. Also they fail to provide adequate bearing surface for the members where said members are independently rotatable so that the implement is comparatively short lived and consequently expensive to operate.

Having the foregoing in mind, it is the primary object of my invention to provide an implement of the above designated type in which the annular ground working members are mounted and relatively arranged so that the implement may be readily and easily turned, particularly when it embodies a large number of such members, and which provides for adequate bearing surface for said members so that the maximum life of the same may be obtained.

Another object is to provide an implement of the above designated type and in which the ground working members may be readily and easily adjusted to take up side play between the same.

Still another object is to provide an implement of this type equipped for the purposes above set forth and which is easy to assemble, durable and economical to manufacture.

To the accomplishment of the above and subordinate objects, presently seen, a preferred embodiment of my invention has been illustrated in the accompanying drawing and will now be described in detail and defined in the claims appended hereto.

In said drawing:

Figure 1 is a view in end elevation of an implement constructed according to my invention.

Fig. 2 is a view in vertical longitudinal section, partly broken away, and taken on the line 2—2 of Fig. 1 and Fig. 3 is a view in side elevation of one of the ground working members with which the implement is equipped.

In its illustrated embodiment my invention comprises a frame 1 including a platform 2 from the opposite ends of which depend a pair of bearing brackets 3. The bearing brackets are preferably formed of angle iron and bolted to the platform 2, as at 4. Journal boxes 5 are formed in said brackets preferably at their lower ends. A shaft 6 is rotatably mounted at its opposite ends in said journal boxes 5 in bearing blocks 7 preferably formed of wood and retained in said boxes 5 by bolts 8 extending from the outside of said boxes into said blocks. Grease or oil cups 9 are mounted in the brackets 3 in communication with the boxes 5 for introducing a suitable lubricant to the journalled ends of the shaft 6. The inner sides of the journal boxes 5 are closed by cap members 10 bolted to said brackets as at 11. Thrust collars 12 secured to the shaft 6, as by set screws 13, prevent end thrust movement of the shaft 6 in the bearing blocks 7.

Mounted upon the shaft 6 is a series of cylindrical drums 14, in this instance three in number, spaced from the thrust collars 12 and the end drums being spaced from the intermediate drum for a purpose presently clear. Each of the drums 14 includes end members 15 including hubs 15¹ and by which said drums are mounted upon the shaft 6. The members 15 are secured in the ends of said drums as by rivets 16. The intermediate drum 14 is adjustably fixed to the shaft 6 by means of set screws 17 passing through the hubs 15¹ thereof. The end drums 14 are freely rotatable upon the shaft 6. Set collars 18 mounted on the shaft 6 to bear against the outer hubs 15¹ of the end drums 14 secure the latter against endwise movement outwardly of the shaft 6.

Mounted upon the drums 14 are two series of ground working members 19 and 20, the members of one series alternating with those of the other. The members 19 of one series takes the form of a hollow annulus the periphery of which is substantially V-shaped in cross section to form a sharp cutting edge. The members 20 of the other series have the form of an annulus 21 having radially projecting teeth 22 substantially spear-shaped. The members 19 and 20 of said series are rotatable upon the drums 14 independently of each other and arranged in order such that the spaces between the drums 14 are bridged by members 19, said bridging members each bearing on two of said drums. The outer ends members 15 of the end drums 14 are provided with radial flanges 23 which retain the members 19 and 20 of the series on the drums 14 as will be clear.

A suitable draft tongue 24 and a seat support, represented at 25, are secured to the platform 1.

By having the end drums 14 freely rotatable on the shaft 6 and the members 19 and 20 similarly mounted upon the drums the implement is rendered particularly flexible for turning operations in either direction. By spacing the drums 14 apart the end drums 14 are adapted for a wide range of adjustment inwardly of the shaft 6 to take up wear between the ground working members 19 and 20. By mounting the members 19 and 20 upon the drums 14 a relatively large bearing surface is provided for said members so that wear of the latter is reduced appreciably and the life of the implement prolonged. As will be readily seen the various parts of the described assembly of drums and ground working members may be easily disassembled for the purpose of replacement of either the drums or members.

It is to be understood the right is herein reserved to changes and modifications in the described construction and relation of parts falling within the scope of the claims appended hereto.

What I claim is:

1. An implement of the class described comprising a frame, a shaft rotatably mounted thereon, a series of cylindrical drums mounted concentrically on said shaft in spaced apart relation, and a plurality of ring-like ground working members mounted on said drums in side by side engaging relation, some of said members bridging the spaces between said drums, and the end drums of the series being freely rotatable on said shaft.

2. An implement of the class described comprising a frame, a shaft rotatably mounted thereon, a cylindrical drum fast on said shaft, a pair of similar drums rotatably mounted on said shaft upon opposite sides of the first drum, respectively, and spaced therefrom, a plurality of ring-like ground working members rotatably mounted upon said drums in side by side engaging relation, some of said members bridging the spaces between said drums, annular flanged members on the outer ends of the drums of said pair for clamping the ground working members therebetween and thereby preventing endwise movement of the drums of said pair inwardly of the shaft, and set collars on said shaft for preventing end play of the drums of said pair outwardly of said shaft.

FREDERICK HUGH RIEHL.